Sept. 21, 1965 G. C. ROBINSON 3,206,808
COMPOSITE-INGOT CASTING SYSTEM
Original Filed Jan. 28, 1960
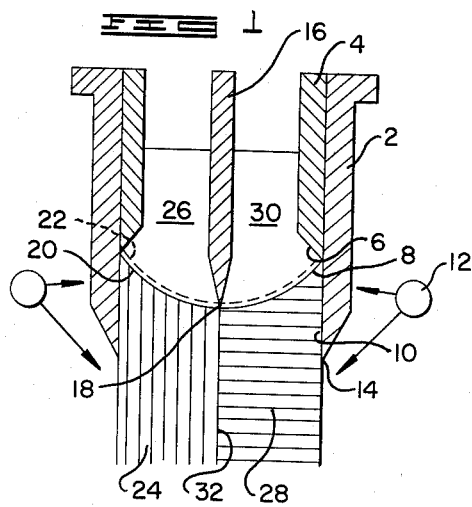
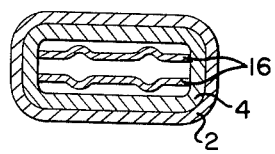
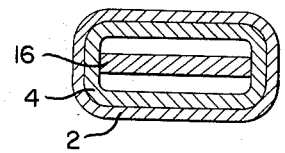
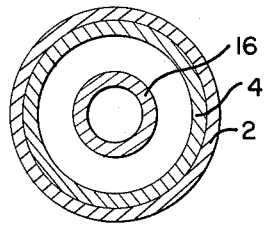
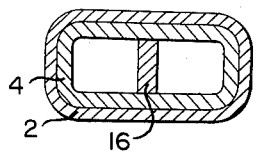
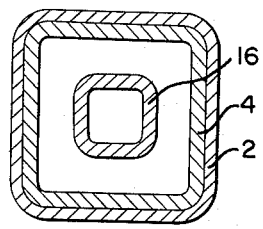
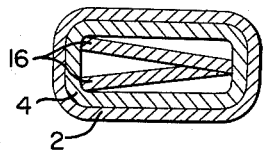
INVENTOR
GROVER C. ROBINSON
by his attorneys
Glenn and Jackson

United States Patent Office 3,206,808
Patented Sept. 21, 1965

3,206,808
COMPOSITE-INGOT CASTING SYSTEM
Grover C. Robinson, Richmond, Va., assignor to Reynolds Metals Company, Richmond, Va., a corporation of Delaware
Continuation of application Ser. No. 5,135, Jan. 28, 1960. This application Aug. 14, 1962, Ser. No. 218,205
9 Claims. (Cl. 22—57.2)

This application is a continuation of my copending parent application Serial No. 5,135, filed January 28, 1960, now abandoned.

This invention relates to the continuous or semi-continuous casting of ingots of aluminum, aluminum alloys, and other metals, and more particularly to methods and apparatus for casting composite ingots of a plurality of metals or metal alloys.

In the manufacture of those composite products commonly called clad products, a large portion of the commercial tonnage is produced by methods employing roll-cladding. The procedure includes preparing an assembly consisting of slabs of cladding material disposed along the opposite sides of a scalped ingot of core material to form a layered structure, heating the assembly, and finally hot-rolling to weld the composite into an integral mass. The method of hot-rolling to bond the core and cladding is also employed for the manufacture of clad rod from a square core enclosed in a sheath of cladding material. Another method of manufacturing clad rod, called insert casting, is based upon the casting of a layer of cladding alloy around a previously cast and scalped ingot of the core alloy. The scalping operation, which is the machining of the surface layers from the ingot, is necessary to provide a fresh metal surface which promotes the bonding of core and cladding. It adds to the manufacturing cost of these cladding processes due to the metal losses which invariably occur during the remelting of the metal removed during scalping, as well as the additional time-consuming machining and ingot handling which scalping requires.

These methods of hot-rolling and insert casting are not successful for all aluminum alloys and various methods have been tried in attempts to form composites from the more troublesome alloys. In one such attempt, high purity aluminum foil was sandwiched between the layers of a composite for the purpose of facilitating bonding during hot-rolling, since high purity aluminum can be clad readily to most aluminum alloys. After bonding had been effected, it was proposed to heat the integrated composite to cause diffusion of the foil metal into the adjacent alloy members, thereby eliminating the separate foil layer and preventing any weakening in mechanical properties in the bond areas which would result from the presence of a discrete layer of high purity aluminum. Although this method has had limited success, it adds materially to the manufacturing cost and is rarely used commercially.

A somewhat analogous method, using zinc to form an interfacial layer to promote bonding, has been tried without outstanding success. In this method, which is applicable to both roll-cladding and insert casting methods of cladding, the elements to be clad are first coated with a thin layer of molten zinc. The zinc layer is subsequently caused to diffuse into the adjacent alloy members.

The limited success of these methods has somewhat extended the list of alloys which may be formed into composite structures, but only at the penalty of increased manufacturing cost. Since the need for production of composite structures of the stronger aluminum alloys has increased during recent years and has not been met satisfactorily by any of the methods heretofore known, efforts to solve this problem have been intensified. The ideal solution to this problem would eliminate all need for scalping and for separately prepared cladding slabs; would permit manufacture of composites of alloys which are presently considered to be incompatible; and would permit a wide latitude in core-cladding configurations beyond the simple sheet and rod forms to which the industry is limited by the present available methods and economic considerations.

The particular object of this invention is to provide a simple, novel, and inexpensive method for the manufacture of composite metal and metal alloy sheet, plate, rod, bar and other shapes. A further object of this invention is to provide a novel and inexpensive method of casting composite metal bodies suitable for further processing by conventional metal working methods. Another object of this invention is to provide both a novel and economical process for the continuous casting of a plurality of aluminum metal alloys into an integral ingot having properties ideally suited for metal working by methods conventionally used in the aluminum industry.

In the operation of this invention, a casting mold is provided with a partition member of a material which is substantially unaffected by contact with molten metals and which can be readily formed, as by casting or machining. One edge of the partition is made to conform closely to the crater surface of the embryo ingot. The contour of the crater surface of the embryo ingot can be determined readily by making a preliminary casting in an identical mold without the partitions, using conditions of ingot withdrawal rate and cooling water rate which will approximate the conditions for casting of the composite ingot. By suddenly stopping the ingot withdrawal, while simultaneously discontinuing the flow of coolant and the addition of molten metal, the molten metal pool in the mold above the surface of the embryo ingot will solidify slowly. Subsequently, the ingot and mold can be separated and the ingot sectioned along the proposed locus of the partition to determine the contour of the intersection of crater surface on the embryo ingot and proposed partition. This may be accomplished by visual inspection of the line of demarcation separating the metal which was solidified by rapid chilling and the metal which was solidified slowly. For those cases where the partition shape is not complex enough to warrant the above described procedure, as for example in the case of a simple transverse partition along an axis of symmetry, a workable determination of the contour of the crater surface on the embryo ingot can be obtained by probing the depth of the crater underlying the molten metal pool, taking care to maintain the casting conditions of ingot withdrawal rate and coolant feed rate at values similar to those proposed for the casting of the composite ingot. Once the shape of the crater has been determined, each partition is provided with one edge having an outline conforming to said shape and is positioned in the mold with its faces substantially parallel to the direction of casting. Each partition is supported externally to prevent movement relative to the mold, and the whole mold assembly is mounted in a casting machine having means for feeding molten metal, means for cooling the exterior of the mold and the emerging ingot, and means for continuously withdrawing the emerging in⸗ot from the mold. Molten metals of such alloys and impositions as may be required are each separately melteᴜ, heated to proper casting temperature and cleaned preparatory to casting, as by chlorine fluxing, and are then simultaneously fed from their respective sources through appropriate individual feed troughs to the designated partitioned sections of the mold.

Contiguous to the solid crater surface on the embryo ingot and underlying the molten metal pool there exists a zone within which the solidification of the metal has progressed to a point where a semi-solid or mushy state exists which is capable of fluid-like flow. The lower end of each partition ideally terminates in this zone and permits the solidifying metals to flow around the end of the partition. In this way the metals may unite to form an integral solid, due to further solidification caused by heat removal through the mold wall and the exterior surface of the ingot. The integral composite ingot is continuously withdrawn from the mold exit and is cut into suitable lengths for further processing using equipment conventionally designed for such cutting, or, in the case of a semi-continuous casting, the casting operation is terminated after the desired length of ingot has been formed. The integral composite ingot so produced is subject to any heat treatment and such other operations as may conventionally be necessary for the further working into finished articles of commerce.

The present invention is especially, though not exclusively, adapted for use in conjunction with the teaching of U.S. Patent 2,983,972 by using the mold designs and the controlled cooling technique disclosed and claimed therein. In accordance with the present invention, there is provided a partition in the mold for each adjacent pair of alloys being cast, the lower edge of the partition being shaped in a manner so as to conform closely to the contour of the embryo ingot surface in the zone wherein solidification initiates. Molten metal is fed from suitable sources, each alloy to its corresponding partitioned section of the mold, to form pools of molten metal in each compartment of the mold. The ingot is formed continuously as heat is removed by the coolant, and an integral composite casting is withdrawn continuously from the exit of the mold.

For a better understanding of the invention and its various objects, advantages and details, reference will be made to present preferred embodiments of the invention which are shown, for purposes of illustration only, in the accompanying drawings.

In the drawing:

FIGURE 1 is a cross-section of part of a casting machine employed in the casting of a dual metal ingot in accordance with the invention; and FIGURE 2 shows in plan view some of the various mold shape and partition arrangements which can be used in the casting of composite ingots.

As shown in FIGURE 1, the mold shell 2 is provided with an insulating liner 4 having an inclined lower surface 6, terminating in contact with inner mold wall 10 at their junction 8. Cooling ring 12, provided with a source of cooling water, not shown, projects sprays of cooling water onto the lower part of the mold shell and onto the surface of the emerging ingot below mold exit 14. Solidification of molten metal is thus initiated on the free meniscus formed between surface 6 and surface 10 in the vicinity of their junction at point 8, as disclosed in the above-mentioned copending application. Partition 16, having a lower tapered section, divides the upper portion of the mold into separate compartments and is supported externally by means not shown. The lower terminus 18 of the partition is shaped in conformity with the contour of the crater surface 20. Furthermore, it is positioned in the mushy-state zone bounded by surface 20 and by broken line 22 which indicates approximately where the initial solidification begins. The emerging ingot has two portions of different constituency integrally joined along plane 32 as shown. Portion 24 is solidified from the contents of molten metal pool 26, and 28 from molten metal pool 30.

FIGURE 2 shows, in plan view, some of the various mold shapes and partition layouts of this invention. In FIGURES 2a and 2b are shown rectangular molds for the casting of ingots suitable for use in the manufacture of sheet products, and having simple transverse plane partitions 16 adapted to the casting of dual alloy composites. Mold and partition configurations for the casting of plane or convolute laminar structures of three different alloys are illustrated in FIGURES 2c and 2d. Also shown are mold and partition configurations for casting concentric circular (FIG. 2e) and square (FIG. 2f) investment-type ingots of two different alloys.

Having described and illustrated the general principles of this invention, reference will be made to specific examples:

Example 1

A rectangular mold adapted to the casting of 8-inch by 3-inch sheet ingots and having an insulating liner of "Marinite" was provided with a ½-inch thick "Marinite" sheet partition, subdividing the mold opening into two equal 8-inch long rectangular compartments, as in FIGURE 2a. ("Marinite" is a Johns-Manville trademark designation for an asbestos material incorporating an inorganic binder.) The partition was tapered from its full ½-inch thickness at its upper end to about 1/32-inch thickness at its lower end, and the lower end of the partition was contoured to follow the shape of the crater surface on the embryo ingot. The configuration was determined by probing the molten metal pool along the proposed plane of the partition during a previous casting run using the same mold and operating parameters, but without a partition. The partitioned mold was mounted in a conventional semi-continuous casting machine having a movable platform for supporting and continuously lowering the casting at a controlled rate of speed.

Molten metal of 7075 type alloy composition was heated to 1350° F., chlorine fluxed, and maintained at 1350° F. in an induction heating tilting crucible. Molten metal of 6063 type aluminum alloy composition was similarly heated and fluxed and maintained at 1350° F. in a separate induction heated furnace. The molten 6063 type aluminum alloy was transferred to a hand pour ladle immediately prior to the start of the casting operation, and at the start of the casting the molten 7075 type alloy and the molten 6063 type alloy were each poured simultaneously from their respective containers into insulated feed troughs leading to the separate mold compartments formed by the partition. The casting was accomplished at an ingot withdrawal rate of 3.05 inches per minute with a 5 gallon per minute cooling water spray rate from a single spray ring, and was terminated after about 8 inches of metal ingot had been cast. Both macroscopic and microscopic visual examination of a suitably polished and etched section of the composite ingot showed an excellent bond and a sharp line of demarcation at the junction of the two alloys. The bond was found to be equally good following subsequent conventional rolling operations.

Example 2

A casting operation similar to that performed in Example 1 was carried out with the same casting equipment using the same ingot withdrawal rate and cooling water flow rate, but using 7075 type aluminum alloy and 5052 type aluminum alloy as the molten metals (the latter being a non-heat treatable wrought alloy composition of Al-Mg). The temperatures of both molten metals were maintained at 1300° F. The resulting 8-inch long composite metal ingot was found to be equally satisfactory in all respects to the ingot of Example 1.

Example 3

A casting was made under conditions otherwise identical to those of Example 2, but a stainless steel partition about 1/64-inch thick was used instead of the "Marinite" partition and the melts used were 7075 type aluminum alloy and 5083 type aluminum alloy (the latter being a non-heat treatable wrought alloy composition of Al-Mg). The results of the casting operation were equivalent to those in Example 2.

Example 4

A circular mold having an insulating liner of "Marinite" and adapted to the casting of 6-inch diameter ingots was fitted with a 3-inch outside diameter cylindrical partition. The partition was also "Marinite," and its inner wall was tapered from a ½-inch thickness to about ¹⁄₃₂-inch thickness at the lower end. The partition was aligned concentrically with the mold axis. Again, the partition lower edge was located in the zone of initial metal solidification, as had been determined by careful measurement of the crater surface shape in a previous casting operation using the same mold without the partition and employing identical ingot withdrawal and cooling water flow rates.

Molten metal of 6063 type aluminum alloy composition was heated to and maintained at 1300° F. in an induction heated tilting crucible. Molten metal of 6063 type aluminum alloy composition with 2% added copper was heated to and maintained at 1300° F. in a separate induction heated surface. The molten metals were chlorine fluxed and the molten 6063-plus-copper alloy composition was transferred to a hand pour ladle. The contents of the tilt crucible and the hand pour ladle were simultaneously poured into separate insulated troughs leading to the concentric compartments formed by the partitioning of the mold. Casting was accomplished at an ingot withdrawal rate of 5 inches per minute, with a 12 gallon per minute cooling water flow-rate, and was terminated when a 20-inch ingot length had been cast. The resultant dual alloy composite ingot had a 3-inch diameter cylindrical core of 6063 type aluminum alloy with 1½-inch annular cladding of 6063-plus-copper alloy metallurgically bonded thereto and forming an integral 6-inch diameter ingot.

As shown by the examples, stainless steel and "Marinite" are suitable partition materials; however, graphite and other heat-resistant materials are possible substitutes.

Those examples which used a copper containing alloy as one component of the composite casting were so chosen simply to expedite metallographic evaluation of the boundary conditions.

While the present preferred embodiments of the invention have been illustrated and described, it will be recognized that the invention may be otherwise variously embodied and practiced within the scope of the following claims.

What is claimed is:

1. Casting apparatus for the production of composite ingots, comprising an annular mold having a feed end and an exit end; a partition extending axially within said mold at said feed end, having a convex terminal portion, said partition dividing the mold into a plurality of closely adjacent compartments, the terminal portion of said partition inwardly of the mold conforming approximately to the crater surface of the ingot to be formed; means adjacent said feed end for continuously feeding separate streams of molten metal to said compartments; and means for continuously cooling metal in the mold to form an ingot.

2. Casting apparatus for the production of composite ingots, comprising an annular mold having a shell portion with a feed end and an exit end, and a heat-insulating liner portion presenting an annular surface disposed interiorly of said shell portion and angularly related thereto; partitioning means extending axially within said mold at said feed end, having a convex terminal portion, said partitioning means dividing the mold into a plurality of compartments, the terminal portion of said partitioning means inwardly of the mold conforming approximately to the crater surface of the ingot to be formed; said terminal portion of the partitioning means extending toward the exit end of the mold from said heat-insulating annular surface.

3. Apparatus for the continuous casting of metal ingots, comprising an annular mold having a passageway therethrough with an entrance end adapted to receive molten metal and an exit end from which solidified metal is withdrawn, the size and shape of said passageway substantially defining the cross-sectional configuration of the resulting ingot; partitioning means extending within the passageway at the entrance end thereof, dividing said passageway into a plurality of closely adjacent compartments, said partitioning means terminating inwardly of the passageway between the entrance and exit ends thereof, and the remainder of said passageway toward the exit end being undivided; means for applying cooling fluid directly against the solidified metal as it emerges from the mold, whereby a crater-like freeze line is established in the metal being cast; and means stabilizing the position of said freeze line in the mold to assure that solidification of the metal commences before the metal reaches the undivided portion of said passageway.

4. Method for the continuous casting of metal to form a composite ingot suitable for processing by conventional mill practice, in which an annular mold having a passageway therethrough of substantially uniform cross-section is divided into a plurality of parallel compartments extending axially within the passageway adjacent one end thereof, part of the passageway being undivided due to the termination of the dividing means intermediate the entrance and exit ends of the passageway, the terminal portion of said dividing means being convex and shaped to conform substantially to the crater formed in the ingot during casting, which method comprises the steps of: concurrently feeding streams of molten metal to said compartments; cooling said streams to establish a zone of semi-solid metal in the mold; maintaining the terminal portion of the dividing means in said zone; and contacting the partially solidified streams within the undivided part of the passageway to accomplish a metallurgical bond between adjacent components.

5. The method of claim 4, in combination with a preliminary operation for determining the crater contour, said operation comprising casting an ingot of substantially uniform composition under similar conditions of ingot withdrawal rate and cooling water flow rate; and shaping the terminal portion of the dividing means to conform to the contour so determined.

6. The method of claim 4, further comprising a preliminary step of casting an ingot having substantially uniform composition, using conventional technique and similar conditions of ingot withdrawal rate and cooling water flow rate, probing said ingot to determine the crater configuration therein; and shaping the terminal portion of said dividing means in accordance therewith.

7. The method of claim 4, in combination with a preliminary casting operation in the same mold, under similar conditions of ingot withdrawal rate and cooling water flow rate but without use of said dividing means, which operation comprises casting an ingot from a source of molten metal having uniform composition; suddenly stopping ingot withdrawal while concurrently discontinuing the addition of molten metal, and allowing the embryo ingot to cool slowly in the mold, whereby a subsequent section of the ingot shows the crater configuration as a demarcation between the metal rapidly cooled and the metal which was solidified slowly; and shaping the terminal portion of said dividing means in accordance therewith.

8. Method for the continuous casting of a metal ingot, in which the metal is kept liquid in a first zone and in which solidification of the metal is accomplished in a second zone, and in which a crater is formed in the metal intermediate said zones and the metal is in a semi-solid condition adjacent said crater, said method comprising the steps of continuously feeding individual streams of molten metal into substantially parallel open-ended compartments of an annular mold, whereby said streams are separated in said first zone; initiating solidification of the metal in each of said streams; and bringing the resulting partially solidified portions of said streams into contact adjacent the boundary between said zones defined by said crater, whereby said streams become metallurgically bonded over a substantially well-defined boundary therebetween, and continuously extracting from said second zone a solidified composite ingot.

9. Method for the continuous casting of metal to form a composite ingot suitable for working, in which an annular mold having a vertical passageway therethrough is divided into a plurality of substantially parallel compartments extending axially within the upper end of said passageway, the dividing means terminating inwardly of the mold and the passageway being undivided below the terminal portion of said dividing means, which method comprises the steps of: feeding streams of molten metal to said compartments; maintaining said streams in their molten condition within said compartments, while cooling the metal to produce a semi-solid condition therein contiguous to said terminal portion; and contacting the partially solidified streams within the undivided portion of the mold passageway to produce a unitary composite casting.

References Cited by the Examiner

UNITED STATES PATENTS

| | | | |
|---|---|---|---|
| 2,543,936 | 3/51 | Reynolds | 22—57.2 |
| 2,569,149 | 9/51 | Brennan | 29—197 |
| 2,569,150 | 9/51 | Brennan | 22—57.2 |
| 2,947,069 | 8/60 | Carlson et al. | 29—197 |

MARCUS U. LYONS, *Primary Examiner.*

MICHAEL V. BRINDISI, *Examiner.*